May 28, 1963         D. S. WAHLSTROM         3,091,255
                   ANTI-FLUTTER POPPET DEVICE
Filed Dec. 1, 1960                        2 Sheets-Sheet 1
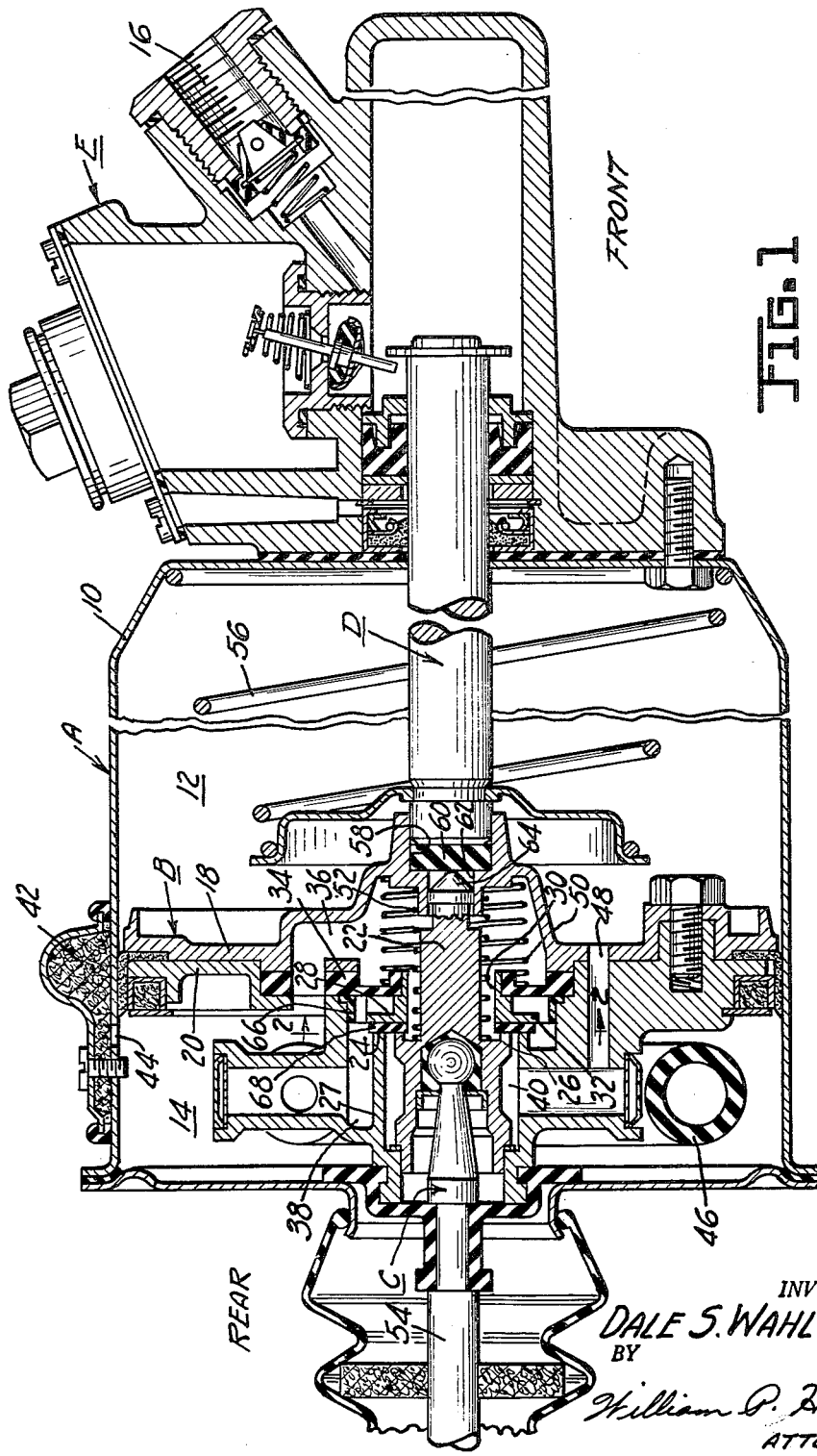
INVENTOR.
DALE S. WAHLSTROM
BY
William P. Hickey
ATTORNEY May 28, 1963 D. S. WAHLSTROM 3,091,255
ANTI-FLUTTER POPPET DEVICE
Filed Dec. 1, 1960 2 Sheets-Sheet 2
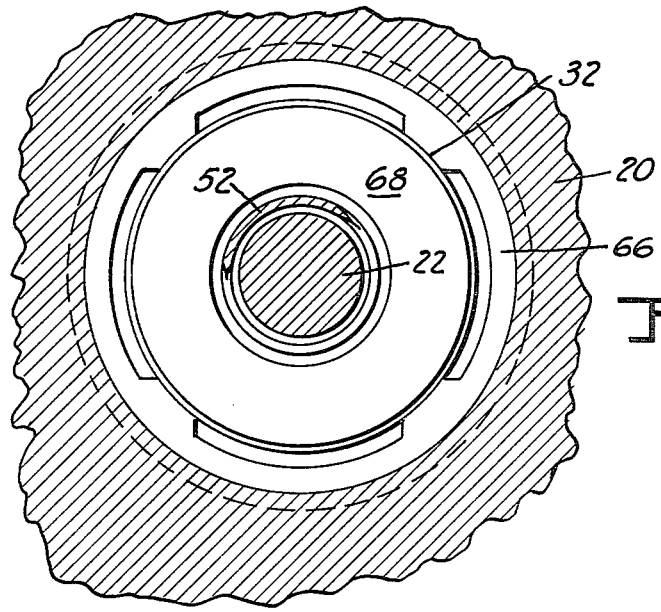
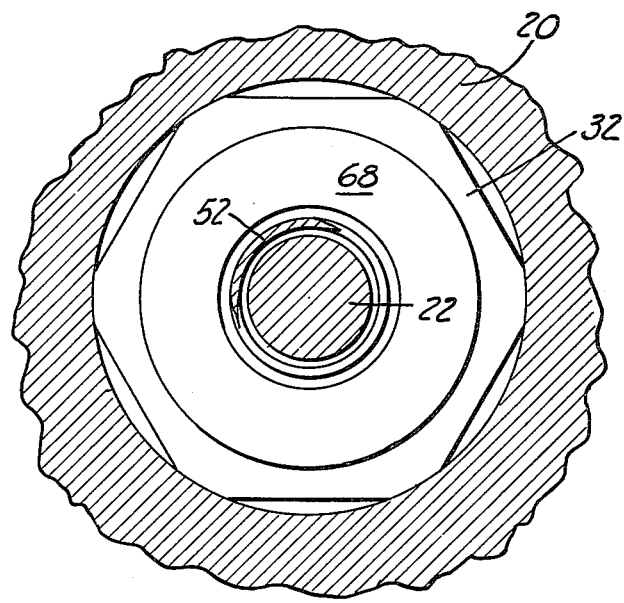
INVENTOR.
DALE S. WAHLSTROM
BY
William P. Hickey
ATTORNEY United States Patent Office 3,091,255
Patented May 28, 1963

1

3,091,255
ANTI-FLUTTER POPPET DEVICE
Dale S. Wahlstrom, South Bend, Ind., assignor to The Bendix Corporation, a corporation of Delaware
Filed Dec. 1, 1960, Ser. No. 73,061
3 Claims. (Cl. 137—620)

The present invention relates to control valves; and more particularly to single poppet valves.

In the general type of valve structure with which we are concerned, a movable poppet is provided with a balancing diaphragm across which pressure sources are exerted which bias the poppet member either toward or against a fixed valve seat, in such manner as to substantially balance the pressure forces which are exerted across the poppet member. Separation of the poppet member from its fixed valve seat is caused by means of a movable control member, which may also have a valve seat thereon that bears against the poppet member to additionally control the fluid flow past the second valve seat. Valve structures of the type previously described are subject to valve flutter under certain conditions; accordingly it is an object of the present invention to provide structure which can be used in such valve structures to prevent flutter.

The invention resides in certain constructions and combinations and arrangements of parts; and further objects and advantages of the invention will become apparent to those skilled in the art to which it relates from the following description of several embodiments described with reference to the accompanying drawings forming a part of this specification, and in which:

FIGURE 1 is a cross sectional view of a power braking unit which embodies principles of the present invention;

FIGURE 2 is a fragmentary cross sectional view taken approximately on the line 2—2 of FIGURE 1; and FIGURE 3 is a fragmentary cross sectional view, similar to FIGURE 2, but showing another embodiment of the present invention.

While the invention may be otherwise embodied, it is herein shown and described as embodied in the control structure of the type of fluid pressure servomotor that is used to power actuate the hydraulic brakes of automotive vehicles.

The power actuated fluid pressure generating device shown in the drawing generally comprises a servomotor A whose stamped cup-shaped sheet metal housing 10 provides an internal chamber therein that is divided into opposing front (right hand side, as seen in the drawing) and rear power chambers 12 and 14 respectively by a movable wall or piston B. Differential pressure across the movable wall B is controlled by a suitable control valve structure C mounted in and carried by the movable wall B—and which control structure, when actuated, causes the movable wall B to force a displacement plunger D into a hydraulic master cylinder E that is attached to the front end of the servomotor A, and thereby displaces fluid under pressure through an outlet connection 16 which is normally connected to a hydraulic braking system, not shown, of an automotive vehicle.

The servomotor A shown in the drawings is of the atmospheric submerged type in which atmospheric pressure is communicated to both opposing power chambers 12 and 14 during the deenergized condition of the servo-

2 motor; and the servomotor is actuated by introducing vacuum from the vehicle's propelling engine into the front power chamber 12 of the servomotor. The structure shown is generally of the same type shown and described in the Earl R. Price application S.N. 699,384, filed November 27, 1957; and for a detailed understanding of its construction and operation reference may be had to that application. In order that the present invention can be understood without reference to that application, a short description will now be given of the structure seen in FIGURE 1.

The movable wall B is formed by means of front and rear sections 18 and 20 respectively having various cavities and passages therein which, when the sections 18 and 20 are bolted together, form the various chambers and passages of the control valve structure C. An axially extending movable control member 22 is positioned in the central cavities of the movable wall sections; and a pair of generally concentric and forwardly facing valve seats 24 and 26 are formed by a partition wall 27 in the rear piston section 20, and a flange on the control member 22, respectively. A generally spool shaped annular poppet structure 28 having a large central opening 30 therethrough, and through which the front reduced diameter section of the control member 22 extends, is positioned forwardly of valve seats 24 and 26 for the purpose of closing off the ports formed by the respective valve seats. The rear flange 32 of the poppet member 28 is suitably coated with rubber for sealing abutment with the respective valve seats 24 and 26; and the front flange 34 is formed by means of a rubber diaphragm—the radially outer peripheral edge of which is suitably clamped between the front and rear sections 18 and 20 of the movable wall B. The area forwardly of the diaphragm 34 and which extends around to include the central opening 30 of the poppet member 28 forms the atmospheric chamber 36 of the valve; the area rearwardly of the diaphragm 34 and which is radially outward of the partition 27 forms the vacuum chamber 38 of the valve; and the annular area between the vacuum valve seat partition 27 and the movable control member 22 forms the control chamber 40 of the valve. Atmospheric pressure is continually communicated to the rear power chamber 14 through the air filter 42 and 44, and thence flows through a suitable opening in the movable wall to the atmospheric chamber 36; vacuum from the vehicle's propelling engine is continually communicated to the vacuum chamber 38 through a flexible rubber tube 46; and the control chamber 40 of the valve continually communicates with the front power chamber 12 through a control passage 48 that is formed in the movable wall B. The spool shaped poppet member 28 is normally held in engagement with the vacuum valve seat 24 by a coil spring 50; and the atmospheric valve seat 26 is normally held out of engagement with the spool shaped poppet member 28 by means of a valve return spring 52 interpositioned between the control member 22 and the front section 18 of the movable wall B. In the normal condition, therefore, of the control valve structure C, the atmospheric valve seat 26 is out of engagement with the poppet member 28; so that atmospheric pressure flows from the rear power chamber 14 through the atmospheric valve chamber 38 and into the control chamber 40, to thereby establish atmospheric pressure in both power chambers 12 and 14 of the servomotor. When it is desired to actuate the servomotor, the control member 22 is moved forwardly by means of the push rod 54 to cause the atmospheric valve seat 26 to engage the poppet member 28 to seal off further communication of the atmosphere with the front power chamber 12; and thereafter further forward movement of the control member 22 causes the poppet member 28 to be moved forwardly out of engagement with the vacuum valve seat 24 to permit air from the front power chamber 12 to flow into the vacuum valve chamber 38 and thence to the intake manifold or the vehicle's propelling engine.

Differential pressure across the movable wall B causes the movable wall to overcome the force of the movable wall return spring 56, and thereafter pushes the displacement plunger B into the hydraulic master cylinder E to actuate the hydraulic brakes of the vehicle. The rear end of the displacement member D is received in a suitable cup-shaped reaction chamber 58 in the forward surface of the movable wall B; and a rubber reaction disc 60 is interpositioned between the bottom of the cup-shaped reaction chamber 58 and the rearward end of the displacement member D, so that it is pressurized whenever force is transmitted from the movable wall to the displacement member. In order that reaction force indicative of the force being transmitted from the movable wall B to the displacement member D will be provided against the control member 22, a small diameter chamber or opening 62 is provided in the front piston section 18 of the movable wall—which opening 62 communicates with the rearward face of the rubber reaction disc 60. A small projection 64 on the forward end of the control member 22 extends into the small diameter opening 62 to the region adjacent the rubber reaction disc 60, so that deformation pressure of the rubber reaction disc will be exerted upon the projection 64 to oppose the actuating movement of the control member 22. For a more complete understanding of the construction and operation of the structure so far described, reference may be had to the above mentioned Earl R. Price application S. N. 699,384

It has been found that the valve structure of the type so far described chatters under some conditions—particularly when a moderately slow actuation of the control valve structure C is made. Applicant has found that this troublesome chatter can be eliminated by the use of a ring 66 positioned between the diaphragm 34 and valve seat 24, and which provides sliding rubbing contact between the annular poppet structure 28 and the housing or die cast section 20. The ring 66 may be made integral with the housing 20, or with the flange 32 of the poppet structure 28; but as in the preferred embodiment shown in FIGURES 1 and 2 of the drawing, is preferably either carried by, or made integral with the housing 20.

Flutter appears to occur in the valve when the control member 22 is moved to the position shown in the drawing, wherein its valve seat 26 bears against the rubber coating 68 on the flange 32 to effect a seal therewith, while at the same time removing some of the sealing force between the vacuum valve seat 24 and the coating 68. At this particular time, very little sealing force is exerted between the valve seat 24 and rubber coating 68; and it is believed that pressure builds up between the seat and poppet to break the seal, and thereby pass into the vacuum chamber 38. After the rubber facing 68 is pushed away from the seat 24, a rapid flow of air commences to the vacuum chamber 38—which according to Bernoulli's theorem, decreases the pressure between the valve seat and rubber which causes the rubber coating of the poppet member to again abut the valve seat 24. Under certain sealing pressure between the poppet member and valve seat, cyclic flow past the valve seat occurs at approximate the resonant frequency of the particular valve structure; so that the small changes in forces between the poppet member and valve seat build up into an appreciable amount of travel which then becomes known as valve flutter. It is believed that the ring 66 provides sufficient braking friction between the poppet member 28 and the valve housing or body to counteract the build up in forces causing separation of the poppet member and valve seat. It is believed that the periodic flow of air across the valve seat 24 sets up pressure waves within the vacuum valve chamber 38, which in the prior art structures are exerted against the balancing diaphragm 34 to materially increase the amplitude of the forces which cause flutter of the poppet member 28. It will be seen that the ring 66 is interpositioned between the valve seat 24 and diaphragm 34, and that it materially shields the diaphragm 34 from the pressure waves generated at the valve seat so as to prevent the full force and effect of these pressure fluctuations from being exerted upon the diaphragm 34.

In the embodiment shown in FIGURE 3 of the drawings the structure providing frictional contact between the valve housing 20 and poppet member 28 is formed by projections on its flange 32 which extend out into sliding engagement with the cylindrical sidewalls of the vacuum valve chamber 38. As shown in the drawing, there are six such areas of contact; and it will further be seen that the extended portion of the flange 32 materially restricts fluid flow communication between the chamber 38 and the diaphragm 34. The embodiment shown in FIGURE 3 is not the preferred embodiment, however, inasmuch as the flow restriction is provided by a structure fastened to the poppet member so that the pressure waves for the most part are still transmitted to the poppet member by reason of this flange extension. The structure shown in FIGURE 3 does however provide damping friction between the poppet member and valve housing 20, and will in some instances produce satisfactory results.

While the invention has been described in considerable detail, I do not wish to be limited to the particular structures shown and described; and it is my intention to cover hereby all novel adaptations, modifications and arrangements thereof which come within the practice of those skilled in the art to which the invention relates.

I claim:

1. In a control valve: a valve body having an annular fixed valve seat therein, a poppet member for abutment with said valve seat, said poppet being fluid pressure responsive, a diaphragm fastened between said poppet member and said valve body which substantially balances the pressure forces on said poppet member, and structure positioned between said valve seat and said diaphragm and providing sliding frictional resistance between said poppet member and said valve body, said structure also providing a flow restriction between said valve seat and said balancing diaphragm which damps out pressure waves, said flow restriction being of the orifice type to effectively damp out pressure surges while permitting quick response of said diaphragm to changes in pressure at said valve seat.

2. In a control valve: a valve body having a generally axially extending valve port having a valve seat extending generally perpendicularly to said valve port, a generally axially extending tubular poppet member having a flange extending generally perpendicularly to said axis for engagement with said valve seat, said valve seat being resiliently biased to oppose fluid pressure thereon, a diaphragm spaced apart axially from said flange and providing a seal between said tubular poppet member and said valve body, said diaphragm substantially balancing pressure forces on said poppet member, and structure providing sliding frictional resistance between the periphery of said flange of said poppet member and said body and restricting fluid communication between said valve seat and said diaphragm, said structure providing a flow resistance of the orifice type to effectively damp out pressure surges while permitting quick response of said diaphragm to changes in pressure at said valve seat.

3. In a control valve: a valve body having a generally axially extending valve port having a valve seat extending generally perpendicularly to said valve port, a generally axially extending tubular poppet member having a flange extending generally perpendicularly to said axis, said flange having a rubber sealing surface for engaging said valve seat, which rubber sealing surface is resiliently disposed between variable pressure chambers, a diaphragm spaced apart axially from said flange and providing a seal between said tubular poppet member and said valve body, said diaphragm substantially balancing pressure forces on said poppet member, and structure providing sliding contact between the periphery of said flange of said poppet member and said body and restricting fluid communication between said valve seat and said diaphragm, said structure providing a flow resistance of the flat plate orifice type to effectively damp out pressure surges while permitting quick response of said diaphragm to changes in pressure at said valve seat.

References Cited in the file of this patent

UNITED STATES PATENTS

| | | |
|---|---|---|
| 1,662,291 | Bastian | Mar. 13, 1928 |
| 1,795,201 | Dashwood | Mar. 3, 1931 |
| 2,526,363 | Jones | Oct. 17, 1950 |
| 2,842,101 | Price | July 8, 1958 |